United States Patent
Chavanne et al.

(10) Patent No.: US 11,985,237 B2
(45) Date of Patent: May 14, 2024

(54) KEY IDENTIFIER DERIVATION AND MANAGEMENT SYSTEMS AND METHODS

(71) Applicant: Intertrust Technologies Corporation, Sunnyvale, CA (US)

(72) Inventors: Pierre Chavanne, Davis, CA (US); Gadi Ittah, Cupertino, CA (US); Guido Cugi, Sunnvale, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 478 days.

(21) Appl. No.: 17/382,152

(22) Filed: Jul. 21, 2021

(65) Prior Publication Data

US 2023/0044472 A1    Feb. 9, 2023

(51) Int. Cl.
*G06F 21/10*    (2013.01)
*H04L 9/06*    (2006.01)
*H04L 9/08*    (2006.01)
*H04L 9/32*    (2006.01)

(52) U.S. Cl.
CPC ........ *H04L 9/0869* (2013.01); *G06F 21/1014* (2023.08); *G06F 21/105* (2013.01); *H04L 9/0643* (2013.01); *H04L 9/0822* (2013.01); *H04L 9/088* (2013.01); *H04L 9/3213* (2013.01); *G06F 21/108* (2023.08); *H04L 2209/603* (2013.01)

(58) Field of Classification Search
CPC ... H04L 9/0869; H04L 9/0643; H04L 9/0822; H04L 9/088; H04L 9/3213; H04L 2209/603; G06F 21/105; G06F 21/10; G06F 21/108; G06F 21/1014
See application file for complete search history.

(56) References Cited

U.S. PATENT DOCUMENTS

| | | | |
|---|---|---|---|
| 2018/0279002 A1* | 9/2018 | Cugi | H04N 21/4627 |
| 2018/0365389 A1* | 12/2018 | Toueg | H04L 63/0807 |
| 2021/0200892 A1* | 7/2021 | Nagao | H04L 9/3297 |
| 2022/0083628 A1* | 3/2022 | Mangalore | H04N 21/4405 |
| 2022/0171832 A1* | 6/2022 | Gallagher | G06F 21/105 |
| 2022/0374502 A1* | 11/2022 | Song | H04L 63/10 |

* cited by examiner

*Primary Examiner* — Shaqueal D Wade-Wright
(74) *Attorney, Agent, or Firm* — John P. Davis; Thayne and Davis LLC

(57) ABSTRACT

This disclosure relates to, among other things, systems and methods for deriving key identifiers and managing mapping between keys and key identifiers. Consistent with embodiments disclosed herein, the disclosed systems and methods may provide a mechanism that allows multiple parties to reconstruct unique identifiers given a set of known inputs that may be used to look up, identify, and/or otherwise access services and/or data objects. In some embodiments, this may allow for a service provider and a rights management service to independently derive key identification information based on information that both entities share (e.g., a content document such as a Content Protection Information Exchange Format document), thereby reducing requirements to maintain such mappings.

15 Claims, 6 Drawing Sheets

KEY IDENTIFIER DERIVATION AND MANAGEMENT SYSTEMS AND METHODS

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing keys. More specifically, but not exclusively, the present disclosure relates to systems and methods for deriving key identifiers and managing mapping between keys and key identifiers.

The Content Protection Information Exchange Format ("CPIX") is a standard defined by the Dynamic Adaptive Streaming Over HTTP ("DASH") Industry Forum that specifies a format for exchanging content protection and packaging information between entities that may use it for preparation of DASH content. CPIX may, in some implementations, provide simplified and/or harmonized interactions between a service provider, an encoder, and/or a rights management system that, among other things, allows rights management services to implement key management services with potentially different interfaces. At least one challenge of implementing CPIX is for a service provider to maintain a mapping between access rights, keys, and/or licenses and associated content, while removing the need for both storing extra information as well as extra communication round trips with an encoder.

Embodiments of the disclosed systems and methods provide a mechanism for a service provider to resolve mapping between content and/or associated content identifiers, keys and/or associated key identifiers ("KIDs"), and/or usage rules. Among other things, the disclosed embodiments may simplify workflows when digital rights management ("DRM") tokens are requested from a DRM service. Consistent with embodiments disclosed herein, the disclosed systems and methods may provide a mechanism that allows multiple parties to reconstruct unique identifiers given a set of known inputs that may be used to look up, identify, and/or otherwise access services and/or data objects. Although various embodiments herein are described in connection with applications involving CPIX, it will be appreciated that the described systems and methods may be employed in variety of other contexts, use cases, and/or applications.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
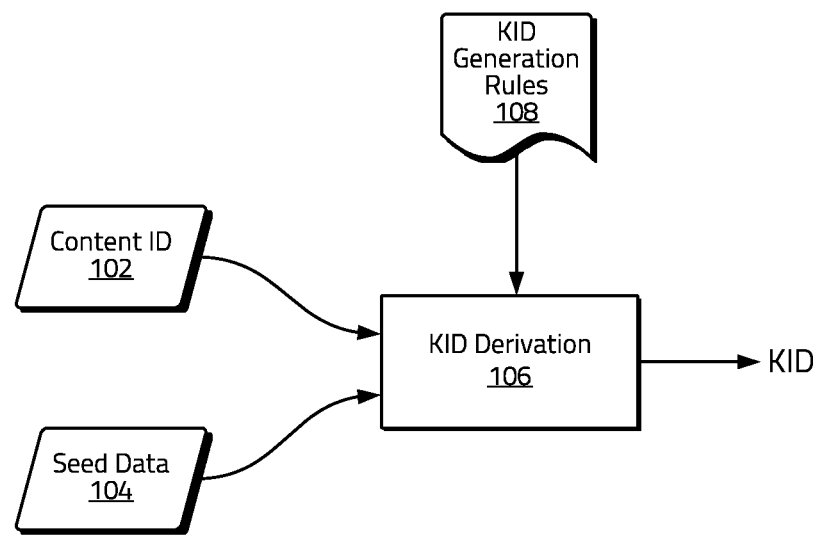
FIG. 1 illustrates a non-limiting example of generating KIDs consistent with certain embodiments disclosed herein.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods provide, among other things, mechanisms that allow for streamlined mapping between content and/or associated content identifiers, keys and/or associated KIDs, and/or usage rules. For example, various embodiments may provide systems and methods for mapping between a DRM key and/or associated KIDs and associated usage rules when requesting DRM tokens and/or licenses. In some embodiments, the disclosed systems and methods may reduce and/or eliminate the need for storing certain mapping information and/or reduce extra communication round trips with an encoder.

Various examples are described in connection with applications involving CPIX, but the disclosed embodiments are not so limited. Indeed, while various examples herein are described in connection with a media domain-specific application, it will be appreciated that embodiments of the disclosed systems and methods may also be employed to other workflows involving a plurality of parties, where various parties process a document with identifiers that are generated by one of the parties but are used by other parties in conjunction with additional information in the document.

For example, various embodiments of the disclosed systems and methods may be used to deterministically generate identifiers and/or associated keys corresponding to members of an object based on known properties associated with an object. Consistent with various disclosed embodiments, the object may comprise an electronic content item and the known properties associated with the object may be articulated in one or more documents and/or other information associated with the object.

In some embodiments, aspects of the disclosed systems and methods may be used in connection with on-the-fly packaging and/or encoding of content, where content catalogues are not pre-packaged and/or pre-encoded, but instead content titles are packaged and/or encoded upon viewer request. This may, among other things, avoid unnecessary packaging and/or encoding of content, as viewers are unlikely to view all content in a larger content catalogue.

In at least one non-limiting example relating to account balance management, attributes associated with an account object may include "first name," "last name" and/or an "account balance." One or more field names may be generated based on one or more of the object attributes and/or shared seed information. For example, three field names may be generated according to: field_1=hash("first_name"+seed), field_2=hash("last_name"+seed), field_3=hash("balance"+seed), and/or the like. The generation operation in this non-limiting example may comprise a hash of a simple concatenation of an attribute and seed, however more complex algorithms to combine the values may also be used, provided that participating components or nodes in the system share knowledge of the combination algorithm. It will also be appreciated that variations to the hashing portion of the generation algorithm may also be employed such as, in one non-limiting example, the use of a keyed hash algorithm making use of a shared secret hashing key that is shared among participating and/or authorized nodes.

In embodiments of the disclosed system, two parties that share knowledge of attributes of a data object can deterministically generate one or more field names for a specific instance of the object. If the shared seed information is unique, the generated field names and/or identifiers will be unique, allowing a party with knowledge of the seed information to reference a member of a specific object. For example, if a first party wanted to request a second party managing access to a user's account balance to increase the balance, the first party may derive the necessary identifiers for the balance of the specific user (e.g., hash("balance"+user ID)), without having to first obtain the identifier for the balance field from a party that generated the user's record.

In certain embodiments, the derivation process may use seed information that may comprise one or more types of seed data and/or seed data values. In some embodiments, individual seed data values may provide one or more aspects of uniqueness, confidentiality, and/or authorization. For example, a combination algorithm may be used for certain data objects and/or members of data objects that may include a shared secret value (e.g., hash("balance"+user ID+shared secret). In this example, the reference to the "balance" member of the object may be widely known and/or published, the user ID may be known to or accessible by a restricted set of system users and/or account holders and may provide a value that may be unique to an instance of the object for a specific account, while the shared secret may be a private, protected value that may not necessarily be unique to a particular request or object instance, but may be shared among systems that are authorized to access and/or adjust balance values. Embodiments that include a combination algorithm comprising one or more of (i) attribute information of the object, (ii) information specific to an instance of the object, and (iii) information available to authorized users and/or systems, can provide both security and efficiency advantages. Such algorithms may increase the difficulty for attackers to construct conforming requests and systems may be configured to detect and/or filter erroneous or malicious requests with relatively minimal processing.

CPIX Documents

CPIX documents may be used in connection with various interactions involving DASH content. In some embodiments, a CPIX document may comprise an XML-based document for specifying content protection information. For example and without limitation, in various embodiments, a CPIX document may comprise keys and/or other DRM information that may be used to protect content (e.g., encrypt content). In some embodiments, CPIX documents may be encrypted and/or otherwise protected to ensure authenticity and/or integrity.

In some embodiments, a CPIX document may include one or more of the following sections and/or associated information:

Content Keys—A CPIX document may comprise keys that may be used for encrypting content. Content keys within a CPIX document may be either in the clear or encrypted.

DRM system signaling information—A CPIX document may comprise DRM system signaling information that may be used in connection with various DRM operations. In some embodiments, the DRM system signaling information may be associated with a particular DRM system. In certain implementations, the DRM signaling information may be inserted into a media manifest file and/or media file associated with the CPIX document.

Content Key Periods—A CPIX document may comprise indications relating to the usage of one or more content keys (which may be included in the CPIX document) and/or associated time periods. For example and without limitation, a CPIX document may comprise an indication of key rotation time boundaries for one or more of the content keys in the CPIX document.

Usage Rules and Filters—A CPIX document may comprise usage rules and/or filters defining the criteria a packager may use to determine how to apply the content keys (e.g., which keys to use for various content resolutions, which key to use for audio tracks, etc.).

Delivery Data—A CPIX document may comprise delivery data that may, in some implementations, comprise keys used to encrypt the content keys in the document.

Update History—A CPIX document may comprise history of updates to the document (e.g., each section of the document may contain an update version pointing to an entry in this section).

Signature—A CPIX document may comprise one or more digital signatures and/or certificates that may be used to, among other things, verify a source and/or the integrity of the document. For example, in certain embodiments, a CPIX document may comprise a digital signature along with an X.509 certificate identifying a signer and associated public key. In some embodiments, each section of the CPIX document may be signed.

Various workflows consistent with the disclosed embodiments may involve a DRM service and a key service provider. Appendix I includes a non-limiting example of a CPIX document returned by a DRM service. In the example, the underlined portions indicate links between the packaging information (e.g., packaging information included in the CPIX document) and the token request that leads to the generation of the DRM licenses. To be able to request a token, the service provider may need to provide information such as KIDs along with the DRM rules (e.g., rental period, output control obligations, etc.). In some implementations, this may be needed for each of the DRM keys signaled in the CPIX document.

As can be seen in the example of Appendix I, each KID defined in <ContentKeyList> may be referenced again in the <ContentKeyUsageRuleList> and therefore it may be the responsibility of the service provider to map each of the KIDs and usage rules to request the correct DRM license. Although KIDs can be overwritten (providing the service provider a chance to define its own KIDs), the service provider may still need to maintain the KID usage rules mapping once the CPIX document is received and/or or to parse the CPIX document when it needs to request a DRM token.

KID Derivation

Embodiments of the disclosed systems and methods provide a mechanism for a service provider to resolve mapping between content and/or associated content identifiers, keys and/or associated KIDs, and/or usage rules. Among other things, the disclosed embodiments may simplify workflows when DRM tokens are requested. Consistent with embodiments disclosed herein, the disclosed systems and methods may provide a mechanism that allows multiple parties to reconstruct unique identifiers given a set of known inputs that may be used to look up services and/or data objects.

In the context of CPIX, embodiments disclosed herein may combine a content identifier—which may be represented as a contented parameter—with descriptive information for usage rules to generate a unique identifier that may be used to derive various KIDs. In this manner, usage rule descriptive information may be used as "seed data" for generating a KID. In embodiments where a CPIX cryptographic period is also indicated, some of the information relative to the cryptographic period (e.g., index and/or ID) may be used as additional seed data for the creation of the unique identifier for those KIDs that may be subject to change.

A non-limiting example of associations between a contented parameter, seed data, a unique identifier, and KID is included below in Table 1.

sistent with embodiments disclosed herein may be performed by a service provider (e.g., a content service provider) and/or a DRM service, although other services and/or systems and/or combinations of the same may also be employed.

As illustrated, KIDs may be derived and/or otherwise generated based, at least in part, on content identification information 102 (e.g., a content ID) and/or seed data 104. A variety of types of seed data 104 may be used in connection with generating KIDs consistent with embodiments disclosed herein. Seed data 104 may comprise, for example and without limitation, content description information (e.g., content resolution and/or format information, audio quality and/or format information, etc.), usage rules and/or rights information (e.g., descriptive usage rules and/or rights information), cryptographic period information, and/or any other information that may be included in a CPIX document and/or information that may be shared between entities deriving KIDs (e.g., information shared between a service provider and a DRM service).

Based on at least the received content identification information 102 and/or seed data 104, a KID derivation module 106 may generate a corresponding KID. In some embodiments, KIDs may be derived and/or otherwise generated based on one or more applicable KID generation rules 108. A KID generation rule 108 may articulate one or more operations and/or transformations applied to content identification information 102 and/or seed data 104 and/or combinations and/or transformations of the same to generate a KID.

In at least one non-limiting example, a KID generation rule 108 may specify that the KID derivation module 106 should generate a KID by first concatenating the content identification information 102 and the seed data 104 to generate a unique identifier. The KID generation rule 108 may further specify that the unique identifier should be hashed and then truncated to a specified byte length to generate a unique KID.

DRM License Generation and Acquisition

Various embodiments of the disclosed systems and methods may be used in connection with DRM license generation and/or acquisition processes associated with DASH content.

TABLE 1

| ContentID | Seed Data (Usage Rule Description) | Unique Identifier (Concatenate ContentID + Seed) | KID (Hash computed over Unique Identifier and truncated to 16 bytes) |
| --- | --- | --- | --- |
| abcd123 | Video_1080p<br>Video_4KUHD<br>Audio_common | abcd123Video_1080p<br>abcd123Video_4KUHD<br>abcd123Audio_common | 842882cc02bd8049cf12017ad80e727c<br>5480b22bc87dc4684129df63358ce932<br>18f574b10a3ad7801501b7d64b38e4a4 |

When requesting a DRM token, a service provider may derive the KIDs by replicating the process based on the known seed information. For example, in the above implementation, the service provider may derive the KIDs using the content identifier and the usage rule description information to generate a KID. In various embodiments, seed information may be provisioned and/or otherwise configured by service provider as part of its workflow. In this manner, an entity and/or service that has a CPIX document in its possession may use information included in the document to derive one or more associated KIDs.

Figure 2:
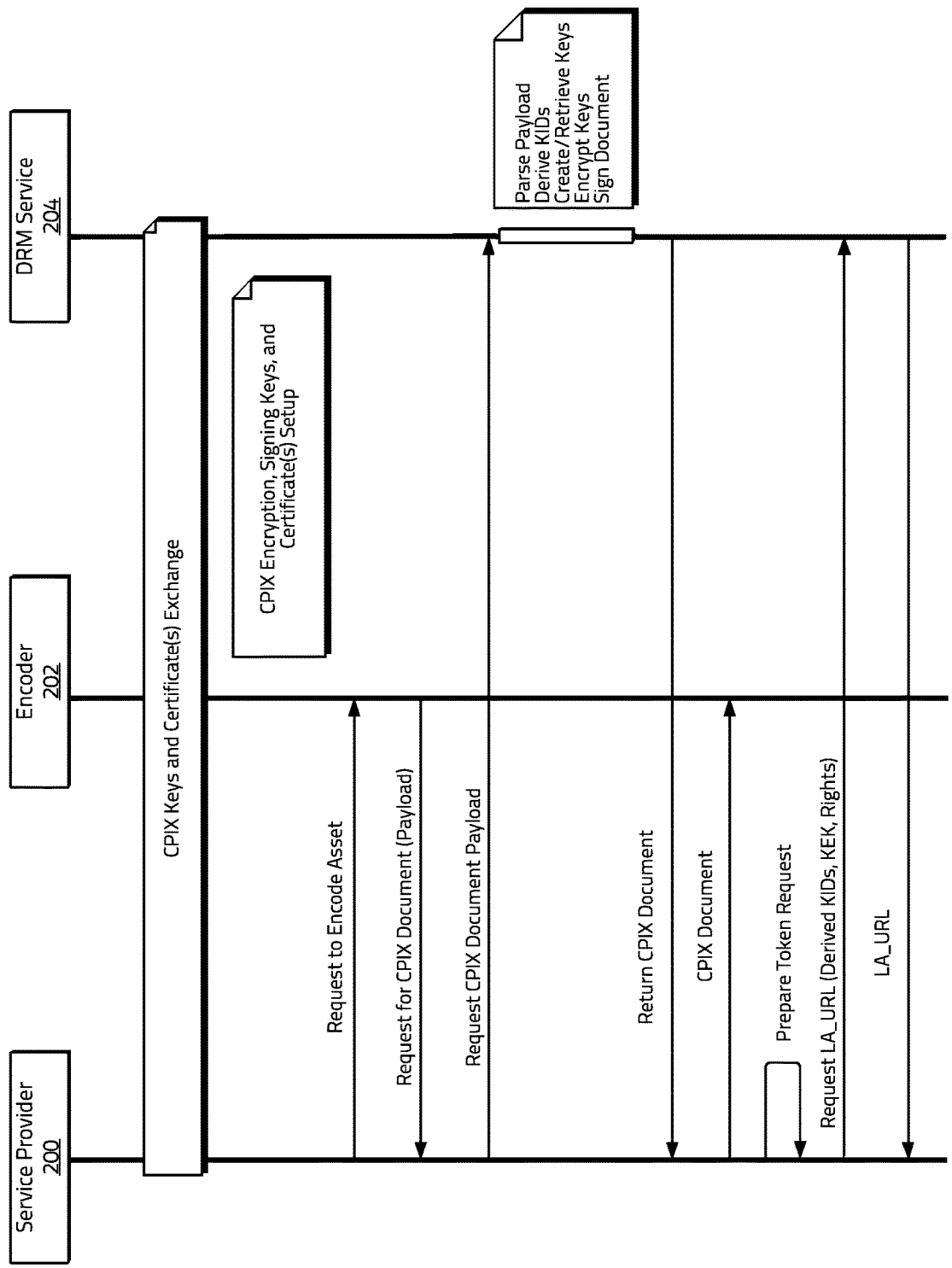
FIG. 2 illustrates a non-limiting example of an interaction between a service provider, an encoder, and a DRM service consistent with certain embodiments disclosed herein.

FIG. 1 illustrates a non-limiting example of generating KIDs consistent with certain embodiments disclosed herein. Various aspects of KID derivation and/or generation con- In various embodiments, a DRM license generation and/or acquisition process may involve a service provider, which may comprise a content service provider, an encoder, and a DRM service. FIG. 2 illustrates a non-limiting example of an interaction between a service provider 200, an encoder 202, and a DRM service 204 consistent with certain embodiments disclosed herein. Although illustrated as separate systems and/or services, it will be appreciated that any suitable number of systems and/or services and/or combinations of systems and/or services may be used to implement the service provider 200, encoder 202, and/or the DRM service 204 and/or aspects and/or functionalities thereof.

The service provider 200, encoder 202, DRM service 204, and/or one or more other associated systems and/or services may comprise a variety of devices, systems, and/or services. For example and without limitation, the service provider 200, encoder 202, DRM service 204, and/or one or more other associated systems and/or services may comprise one or more laptop computer systems, desktop computer systems, server computer systems, distributed computer systems, and/or any other type of computing system and/or device.

In certain embodiments, the service provider 200, encoder 202, DRM service 204, and/or one or more other associated systems and/or services may comprise at least one processor system configured to execute instructions stored on an associated computer-readable storage medium. As discussed in more detail below, the service provider 200, encoder 202, DRM service 204, and/or one or more other associated systems and/or services may further comprise a trusted execution environment ("TEE") and/or a secure processing unit ("SPU") that may be configured to perform sensitive operations such as trusted credential, certificate, and/or key management, secure policy and/or rule enforcement and/or management, and/or other aspects of the systems and methods disclosed herein.

The service provider 200, encoder 202, DRM service 204, and/or one or more other associated systems and/or services may further comprise software and/or hardware configured to enable electronic communication of information between the service provider 200, encoder 202, DRM service 204, and/or one or more other associated systems and/or services via a network using any suitable communication technology, standard, and/or combinations thereof. The service provider 200, encoder 202, DRM service 204, and/or one or more other associated systems and/or services may be communicatively coupled using a variety of networks and/or network connections. In certain embodiments, the network connections may comprise a variety of network communication devices and/or channels and may utilize any suitable communications protocols and/or standards facilitating communication between the service provider 200, encoder 202, DRM service 204, and/or one or more other associated systems and/or services.

The network connections may comprise Internet, a local area network, a virtual private network, and/or any other communication network connections utilizing one or more electronic communication technologies and/or standards (e.g., Ethernet or the like). In some embodiments, the network connections may comprise a wireless carrier system such as a personal communications system ("PCS") and/or any other suitable communication system incorporating any suitable communication standards and/or protocols. In further embodiments, the network connections may comprise analog mobile communications network connections and/or a digital mobile communications network connections utilizing, for example and without limitation, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and/or any other suitable standard or standards.

As illustrated, the various entities 200-204 may engage in a key and/or certificate exchange process consistent with implementation of the CPIX protocol. For example, one or more of the service provider 200, the encoder 202, and/or the DRM service 204 may engage in a CPIX key and/or certificate exchange process. The encoder 202 and the DRM service 204 may further engage in a CPIX encryption, signing keys and/or certificate exchange and/or setup process.

The service provider 200 may communicate a request to encode an asset to the encoder 202. In some embodiments, the asset the service provider 200 may wish to encode may comprise a content file and/or a plurality of content files. The request to encode the asset may, in certain embodiments, comprise the asset and/or an associated electronic file.

In response, the encoder 202 may return a request to the service provider 200 for a CPIX document associated with the asset to be encoded. In some embodiments, the request may include a CPIX document payload. In further embodiments, the CPIX document payload may be provided to the service provider 200 separate from the request. The CPIX document payload may comprise, for example and without limitation, information relating to a type of asset to encode (e.g., a type of content stream), content identification information, rights and/or rules, and/or other information that may be included in a CPIX document.

The service provider 200 may communicate the request and/or the associated payload, either together or separately, to the DRM service 202. The DRM service 204 may parse the payload associated with the CPIX document request, derive the KIDs, generate and/or retrieve keys, encrypt the generated and/or retrieved keys, generate an associated CPIX document, and then sign the resulting CPIX document.

Consistent with embodiments disclosed herein, the DRM service 204 may derive the KIDs based, at least in part, on information included in the payload associated with the CPIX document request. In some embodiments, KIDs may be derived and/or otherwise generated based, at least in part, on content identification information (e.g., a content ID) and seed data, potentially in accordance with one or more applicable KID generation rules articulating one or more operations and/or transformations applied to content identification information and/or seed data used to generate a KID. For example and without limitation, a KID may be generated by concatenating content identification information and seed data to generate a unique identifier, hashing the unique identifier, and then truncating the hashed identifier to a specified byte length.

The signed CPIX document may be returned to the service provider 200 by the DRM service 204. The service provider 200 may then provide the signed CPIX document to the encoder 202.

The service provider 200 may engage in a token request preparation process. The service provider 200 may issue a request for a license acquisition location (e.g., a license acquisition URL) to the DRM service 204. In connection with issuing the request, the service provider 200 may derive one or more associated KIDs using information included in the signed CPIX document received by the service provider from the DRM service 204. For example and without limitation, the service provider 200 may derive a KID based, at least in part, on content identification information and/or seed data that may be included in the CPIX document. In further embodiments, the CPIX document may comprise one or more KIDs, and the service provider 200 may extract the included KID from the CPIX document.

In some embodiments, the request for a license acquisition token used by the service provider 200 to the DRM service 204 may include one or more of the extracted, generated, and/or otherwise derived KIDs, one or more key encryption keys ("KEKs"), and/or associated rights information. In response to the request, the DRM service 204 may return to the service provider 200 the license acquisition location (e.g., a license acquisition URL). The service provider 200 may retrieve an associated DRM license based, at least in part, on the license acquisition location.

As discussed above, in various embodiments, KIDs may be generated by concatenating content identification information, referred to in certain instances herein as a ContentId, which may be received as part of a CPIX document and/or a payload for a CPIX document with one or more of seeds, which may be received as part of a CPIX document and/or a payload for a CPIX document and/or be defined by the service provider 200 and/or the DRM server 204. In some implementations, the contented may comprise a fixed identifier associated with a particular content item.

In certain non-limiting embodiments, if a cryptographic period identifier is indicated for a given key, some of the information (e.g., the ID, an associated index, and/or the like) may be appended to the concatenated ContentId. A hash of the concatenated ContentId may be generated (e.g., a SHA1 hash of the concatenated ContentId). A subset of the characters (e.g., hex characters) and/or bytes of the generated hash may be used as a KID. For example and without limitation, in some embodiments, the first 32 characters and/or 16 bytes of the generated hash may be used as a KID.

KID Derivation Example

A non-limiting example of code for deriving KIDs given a contents and a list of usage rule descriptions and content key period IDs is provided below:

```
import hashlib
def main( ):
    print("**** KIDs Derivation for the following Usage Rules
    Descriptors and ContentId")
    #example of Usage Rules Descriptors & content Key Crypto Period
    IDs
    usageRuleDesc = ["video_4K", "video_1080p", "video_720p",
    "audio_common"]
    #example of Content ID
    contentiD = "abc123"
    print ("ContentiD="+contentiD)
    #Print out each derived KID
    for i in usageRuleDesc :
        print("Usage Rule Descriptor="+i)
        KID = getDeriveKidFromString(contentiD+i)
        print ("KID="+KID)
    print ("**** End")
# Simple KID Derivation Function
def getDeriveKidFromString(aString):
    return hashlib.sha1(aString.encode('utf-8')).hexdigest( )[0:31]
if __name__ == "__main__":
    main( )
```

When executed, the above example code may print the following generated KID information:

```
**** KIDs Derivation for the following Usage Rules Descriptors and
ContentId
ContentiD=abc123
Usage Rule Descriptor=video_4K
KID=90d642546096b27188d88691c41896c
Usage Rule Descriptor=video_1080p
KID=54ffce1d55e73a29c1c1c3859e9a6a4
Usage Rule Descriptor=video_720p
KID=fbd86aa6fdbb753142f944b9bf0052a
Usage Rule Descriptor=audio_common
KID=3d070cb5e4371899668c9d693c5f915
**** End
```

DRM Service KID Derivation

As discussed above, in certain embodiments, a DRM service may generate and/or otherwise derive a KID. The DRM service may generate and/or otherwise derive a KID in response to receiving a request to generate a content document from a service provider. For example, the DRM service may generate and/or otherwise derive a KID after receiving receipt of a request from a service provider to generate a CPIX document.

Figure 3:
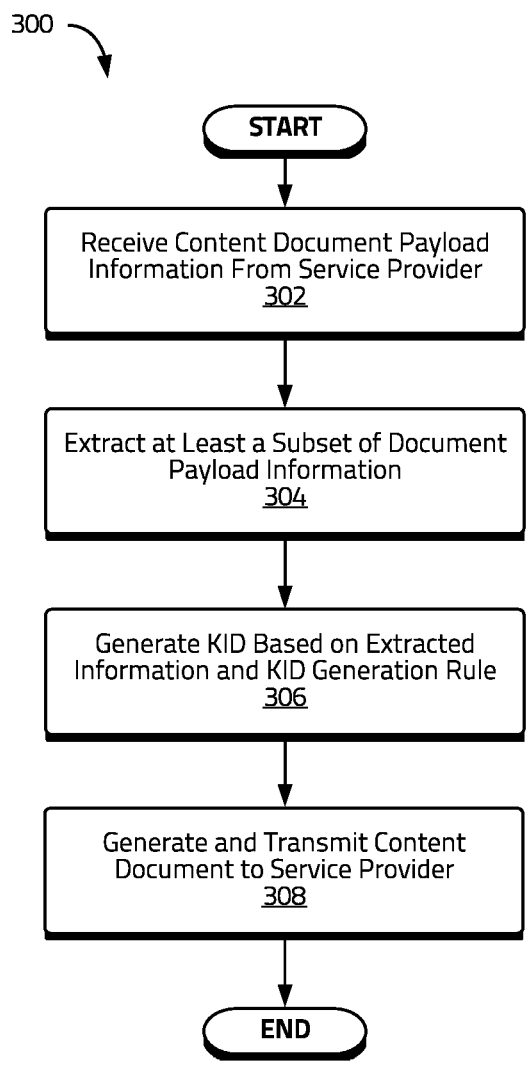
FIG. 3 illustrates a flow chart of a non-limiting example of a method for generating KIDs performed by a DRM service consistent with certain embodiments disclosed herein.

FIG. 3 illustrates a flow chart of a non-limiting example of a method 300 for generating KIDs performed by a DRM service consistent with certain embodiments disclosed herein. The illustrated method 300 may be implemented in a variety of ways, including using software, firmware, hardware, and/or any combination thereof. In certain embodiments, various aspects of the method 300 and/or its constituent steps may be performed by a DRM system.

At 302, content document payload information may be received from a service provider. For example, a service provider may provide a DRM service with CPIX document payload information. In some embodiments, the document payload information may be included in a request from the service provider for a CPIX document. In further embodiments, the document payload information may be received separate from a CPIX document request.

The document payload may comprise, for example and without limitation, information relating to a type of associated asset and/or content (e.g., a type of content stream), content identification information, cryptographic keys, cryptographic key periods, rights and/or rules associated with content, and/or any other information that may be included in a content document such as a CPIX document.

At least a subset of the content document payload information may be extracted at 304 for use in connection with generating and/or deriving KIDs. For example, in some embodiments content identification information (e.g., a content ID) and/or seed data may be extracted from the payload information. A variety of types of seed data may be used in connection with deriving and/or otherwise generating KIDs consistent with embodiments disclosed herein. Seed data may comprise, for example and without limitation, content description information, usage rules and/or rights information, cryptographic period information, and/or any other information that may be included in a content document and/or information that may be shared between entities deriving KIDs.

At 306, a KID may be derived and/or otherwise generated based, at least in part, on the extracted information. In some embodiments, a KID may be derived and/or otherwise generated in accordance with one or more applicable KID generation rules articulating and/or operations and/or transformations applied to the extracted information to generate a KID. For example, in at least one embodiment, a KID may be derived and/or otherwise generated by concatenating content identification information and usage rules and/or rights information to generate a unique identifier. The unique identifier may then be hashed, and the resulting hash value may be truncated to a specified byte length. The truncated hash value may then be used as the KID.

The DRM service may generate a content document based on the received content document payload information and return the generated content document to the service provider at 308. For example, in some embodiments, the DRM service may generate a CPIX document based on the received CPIX payload information and return the generated CPIX document to the service provider. In some embodiments, the DRM service may digitally sign the content and/or CPIX document prior to returning the document to the service provider.

Service Provider KID Derivation

Consistent with embodiments disclosed herein, a service provider may generate and/or otherwise derive KIDs based, at least in part, on information included in a content document (e.g., a CPIX document) received from a DRM service. In certain embodiments, a KID may be derived as part of a DRM token request generation process. For example, a service provider may derive a KID consistent with various embodiments disclosed herein in connection with requesting a DRM token and/or other access rights from a DRM service.

Figure 4:
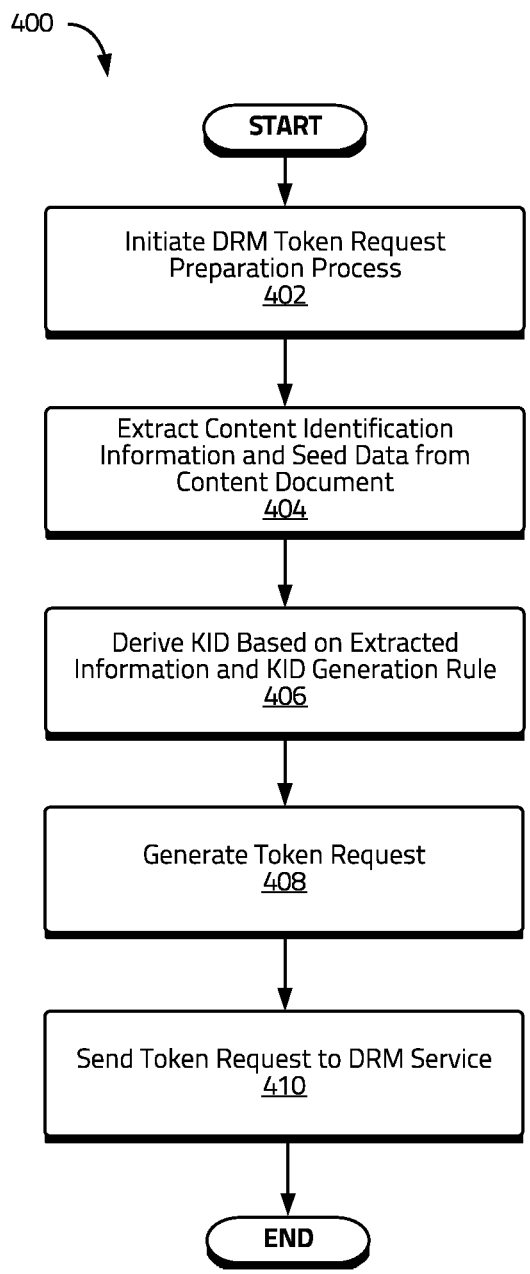
FIG. 4 illustrates a flow chart of a non-limiting example of a method for generating KIDs performed by a service provider consistent with certain embodiments disclosed herein.

FIG. 4 illustrates a flow chart of a non-limiting example of a method 400 for generating KIDs performed by a service provider consistent with certain embodiments disclosed herein. The illustrated method 400 may be implemented in a variety of ways, including using software, firmware, hardware, and/or any combination thereof. In certain embodiments, various aspects of the method 400 and/or its constituent steps may be performed by a service provider.

At 402, a service provider may initiate a DRM token request preparation process associated with an electronic content item. As part of the process, content identification information and/or seed data may be extracted from a content document associated with the electronic content item at 404. In some embodiments, the content document may comprise a CPIX document. For example, in certain embodiments, the content document may comprise a CPIX document received from and/or otherwise issued by a DRM service. In some embodiments, the method 400 may comprise verifying a digital signature included in and/or otherwise associated with the content document to determine that the content document was digitally signed by the DRM service.

A variety of types of seed data may be used in connection with generating KIDs consistent with embodiments disclosed herein. Seed data may comprise, for example and without limitation, content description information (e.g., content resolution and/or format information, audio quality and/or format information, etc.), usage rules and/or rights information (e.g., descriptive usage rules and/or rights information), cryptographic period information, and/or any other information that may be included in a CPIX document and/or information that may be shared between entities deriving KIDs (e.g., information shared between a service provider and a DRM service).

At 406, a KID may be generated. Consistent with embodiments disclosed herein, a KID may be generated based, at least in part, on the extracted content identification information and the seed data. In some embodiments, a KID may be derived and/or otherwise generated in accordance with one or more applicable KID generation rules articulating and/or operations and/or transformations applied to the extracted information to generate a KID. The operations and/or transformations may include, for example and without limitation, one or more concatenation operations, hashing operations, truncation operations, and/or the like. In at least one non-limiting example, a KID may be derived and/or otherwise generated by concatenating content identification information and usage rules and/or rights information to generate a unique identifier. The unique identifier may then be hashed, and the resulting hash value may be truncated to a specified byte length. The truncated hash value may then be used as the KID.

The generated KID may be included in a rights management token request at 408. In some embodiments, the rights management token request may further comprise one or more KEKs and/or rights information. At 410, the rights management token request may be issued to a DRM service by the service provider system. In some embodiments, if the service provider system is authorized, the DRM service may issue a rights management token to the service provider system.

Figure 5:
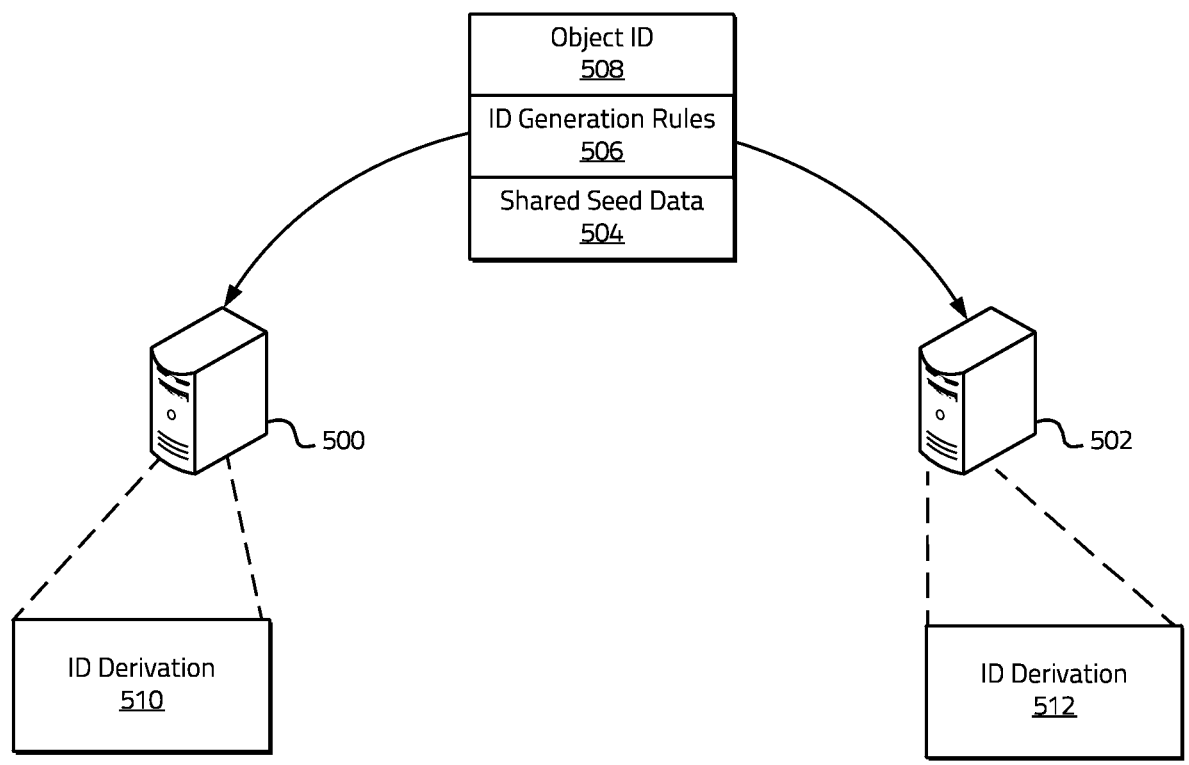
FIG. 5 illustrates a non-limiting example of generating identification information based on seed data and generation rules consistent with certain embodiments disclosed herein.

FIG. 5 illustrates a non-limiting example of generating identification information based on seed data 504 and generation rules 506 consistent with certain embodiments disclosed herein. As discussed above, embodiments of the disclosed systems and methods may be employed in connection with a variety of workflows involving a plurality of parties 500, 502. In certain embodiments, the illustrated parties 500, 502 may comprise any computing device and/or system suitable to implement various aspects of the systems and methods disclosed herein. For example, in some embodiments, one or more of the parties 500, 502 may be associated with a system and/or device associated with a user and/or service provider, an encoder, a DRM service, and/or the like.

Embodiments of the disclosed systems and methods may be used by one or more parties 500, 502 to derive keys, KIDs, and/or other identification information that may be associated with one or more objects (e.g., content items). In certain embodiments, information that may be used to deterministically generate and/or otherwise derive keys, KIDs, and/or other identification information may be provisioned to (e.g., provisioned by a service) and/or otherwise exchanged between parties 500, 502. For example, information that may be used to derive keys and/or KIDs may be exchanged between parties 500, 502 and/or otherwise be provisioned to parties 500, 502 (e.g., provisioned by a different service and/or the like) in connection with a CPIX document exchange.

In the illustrated example, parties 500, 502 may exchange and/or be provisioned with object identification information 508, one or more identifier generation rules 506 (e.g., KID generation rules), and/or seed data 504. In certain embodiments, the object identification information 508 may comprise a content ID, although other types of object identification information may also be used. A variety types of seed data 504 may be used in connection with aspects of the disclosed embodiments including, for example and without limitation, description information associated with an object (e.g., content description information such as content resolution and/or format information, audio quality and/or format information, etc.), usage rules and/or rights information associated with an object, cryptographic period information, and/or any other information, including information that that may be included in a document associated with an object.

Based on the object identification information 508, one or more identifier generation rules 506, and/or the seed data 504, the parties 500, 502 may deterministically generate keys and/or identification information (e.g., using ID derivation modules 510, 512). For example, consistent with embodiments disclosed herein, a KID may be generated based on the object identification information 508 and the seed data 504 in accordance with the one or more identifier generation rules 506.

Figure 6:
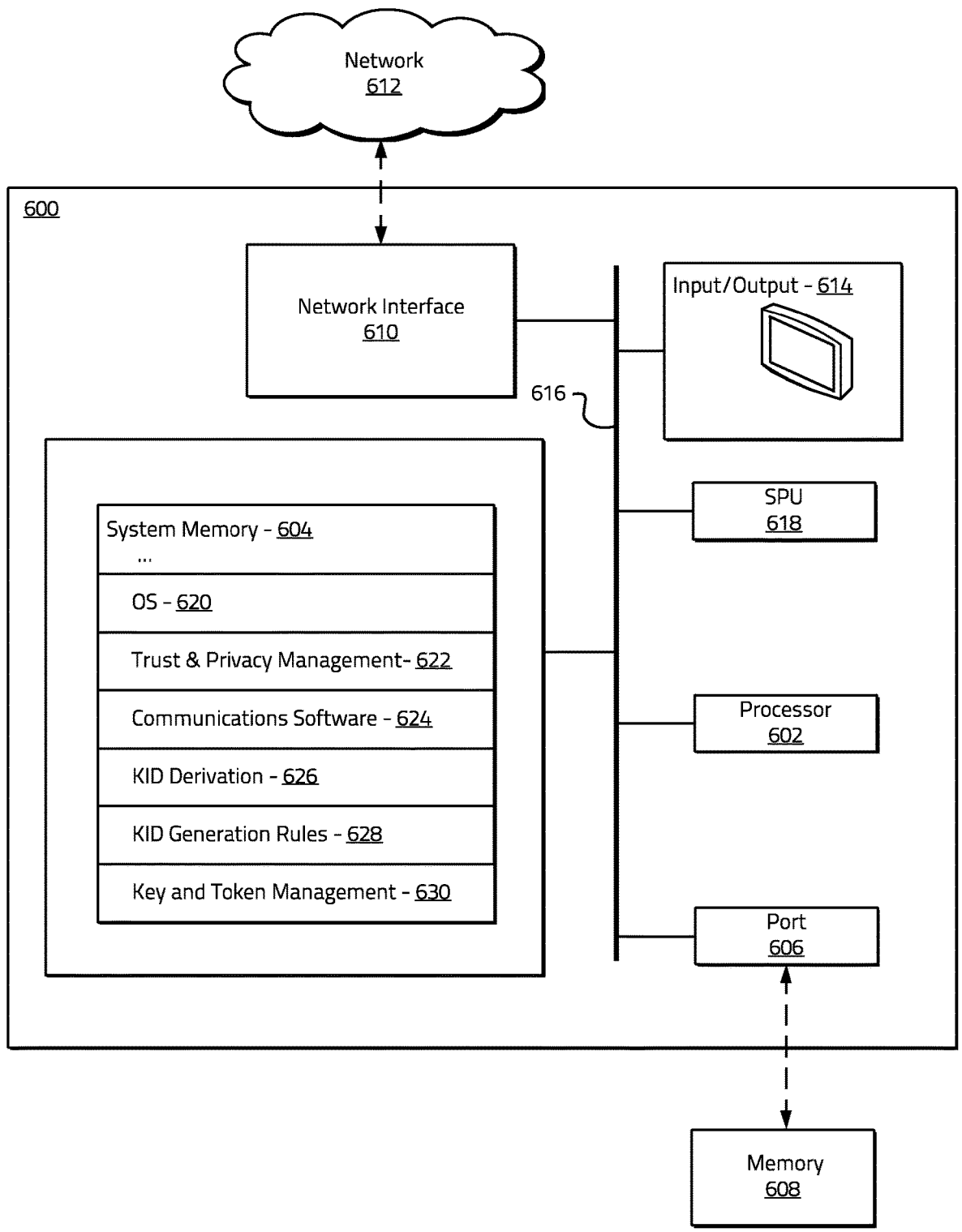
FIG. 6 illustrates a non-limiting example of a system that may be used to implement certain embodiments of the systems and methods of the present disclosure.

FIG. 6 illustrates an example of a system 600 that may be used to implement certain embodiments of the systems and methods of the present disclosure. The system 600 may comprise a variety of computing devices and/or systems, including any computing system suitable to implement the systems and methods disclosed herein. In various embodiments, the system 600 may comprise a system and/or device associated with a user and/or service provider, an encoder, a DRM service, and/or any other service, system, device, application and/or component configured to implement aspects of the embodiments of the disclosed systems and methods.

As illustrated in FIG. 6, the example system 600 may comprise: a processing unit 602; system memory 604, which may include high speed random access memory ("RAM"), non-volatile memory ("ROM"), and/or one or more bulk non-volatile computer-readable storage mediums (e.g., a hard disk, flash memory, etc.), which may be non-transitory, for storing programs and other data for use and execution by the processing unit 602; a port 606 for interfacing with removable memory 608 that may include one or more diskettes, optical storage mediums (e.g., flash memory, thumb drives, USB dongles, compact discs, DVDs, etc.) and/or other computer-readable storage mediums, which may be non-transitory; a network interface 610 for communicating with other devices and/or systems via one or more network connections and/or networks 612 using one or more communication technologies; a user interface 614 that may include a display and/or one or more input/output devices such as, for example, a touchscreen, a keyboard, a mouse, a track pad, and the like; and one or more busses 616 for communicatively coupling the elements of the system.

In some embodiments, the system 600 may, alternatively or in addition, include a TEE and/or an SPU 618 that is protected from tampering by a user of the system or other entities by utilizing secure physical and/or virtual security techniques. A TEE and/or a SPU 618 can help enhance the security of sensitive operations such as personal information management, trusted credential and/or key management, privacy and policy management, and other aspects of the systems and methods disclosed herein. In certain embodiments, the TEE and/or SPU 618 may operate in a logically secure processing domain and be configured to protect and operate on secret information, as described herein. In some embodiments, the TEE and/or a SPU 618 may include internal memory storing executable instructions or programs configured to enable the TEE and/or SPU 618 to perform secure operations, as described herein.

The operation of the system 600 may be generally controlled by the processing unit 602, TEE, and/or an SPU 618 operating by executing software instructions and programs stored in the system memory 604 (and/or other computer-readable media, such as memory 608, which may be removable). The system memory 604 may store a variety of executable programs or modules for controlling the operation of the system. For example, the system memory may include an operating system ("OS") 620 that may manage and coordinate, at least in part, system hardware resources and provide for common services for execution of various applications and a trust and privacy management system 622 for implementing trust and privacy management functionality including protection and/or management of secure data through management and/or enforcement of associated policies.

The system memory 604 may further include, without limitation, communication software 624 configured to enable in part communication with and by the system, one or more applications, KID derivation modules 626 configured to derive KIDs consistent with various aspects of the disclosed embodiments, one or more KID generation rules 628, key and/or token management services 630, and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

APPENDIX I

```
<?xml version='1.0' encoding='UTF-8'?>
<CPIX xmlns:pskc="urn:ietf:params:xml:ns:keyprov:pskc"
xmlns:xsi="http://www.w3.org/2001/XMLSchema-instance"
xmlns="urn:dashif:org:cpix" xsi:schemaLocation="urn:dashif:org:cpix
cpix.xsd" ContentId="abcd123">
    <ContentKeyList>
        <ContentKey kid="e82f184c-3aaa-57b4-ace8-606b5e3febad">
            <Data>
                <pskc:Secret>
                    <pskc:PlainValue>...</pskc:PlainValue>
                </pskc:Secret>
            </Data>
```

APPENDIX I-continued

```
      </ContentKey>
      <ContentKey kid="087bcfc6-f7a5-5716-b840-6aa6eba3369e">
        <Data>
          <pskc:Secret>
            <pskc:PlainValue>...</pskc:PlainValue>
          </pskc:Secret>
        </Data>
      </ContentKey>
      <ContentKey kid="0d6b4023-8da1-5e75-af68-75c514c59b63">
        <Data>
          <pskc:Secret>
            <pskc:PlainValue>...</pskc:PlainValue>
          </pskc:Secret>
        </Data>
      </ContentKey>
  </ContentKeyList>
  <DRMSystemList>
      <!-- Widevine -->
      <DRMSystem kid="e82f184c-3aaa-57b4-ace8-606b5e3febad" systemId="edef8ba9-79d6-4ace-a3c8-27dcd51d21ed">
          <PSSH>...</PSSH>
          <ContentProtectionData />
      </DRMSystem>
      <!-- PlayReady -->
      <DRMSystem kid="e82f184c-3aaa-57b4-ace8-606b5e3febad" systemId="9a04f079-9840-4286-ab92-e65be0885f95">
          <PSSH>...</PSSH>
          <ContentProtectionData />
      </DRMSystem>
      <!-- Widevine -->
      <DRMSystem kid="087bcfc6-f7a5-5716-b840-6aa6eba3369e" systemId="edef8ba9-79d6-4ace-a3c8-27dcd51d21ed">
          <PSSH>...</PSSH>
          <ContentProtectionData />
      </DRMSystem>
      <!-- PlayReady -->
      <DRMSystem kid="87bcfc6-f7a5-5716-b840-6aa6eba3369e" systemId="9a04f079-9840-4286-ab92-e65be0885f95">
          <PSSH>...</PSSH>
          <ContentProtectionData />
      </DRMSystem>
      <!-- Widevine -->
      <DRMSystem kid="0d6b4023-8da1-5e75-af68-75c514c59b63" systemId="edef8ba9-79d6-4ace-a3c8-27dcd51d21ed">
          <PSSH>...</PSSH>
          <ContentProtectionData />
      </DRMSystem>
      <!-- PlayReady -->
      <DRMSystem kid="0d6b4023-8da1-5e75-af68-75c514c59b63" systemId="9a04f079-9840-4286-ab92-e65be0885f95">
          <PSSH>...</PSSH>
          <ContentProtectionData />
      </DRMSystem>
  </DRMSystemList>
  <ContentKeyUsageRuleList>
      <ContentKeyUsageRule kid="e82f184c-3aaa-57b4-ace8-606b5e3febad">
          <!-- 1080p-->
          <VideoFilter minPixels="2073600" maxPixels="2073600"/>
      </ContentKeyUsageRule>
      <ContentKeyUsageRule kid="087bcfc6-f7a5-5716-b840-6aa6eba3369e">
          <!-4K UHD-->
          <VideoFilter minPixels="8294400"/>
      </ContentKeyUsageRule>
      <ContentKeyUsageRule kid="0d6b4023-8da1-5e75-af68-75c514c59b63">
          <!-- audio-->
          <AudioFilter/>
      </ContentKeyUsageRule>
  </ContentKeyUsageRuleList>
</CPIX>
```

What is claimed is:

1. A method for generating a rights management token request performed by a service provider system comprising a processor and a computer-readable storage medium storing instructions that, when executed by the processor, cause the service provider system to perform the method, the method comprising:
   initiating a rights management token request preparation process associated with an electronic content item;
   extracting content identification information and seed data from a content document associated with the electronic content item;
   generating key identification information based on the extracted content identification information and the seed data;
   generating a rights management token request, the generated rights management token comprising the key identification information; and
   transmitting the rights management token request to a digital rights management service.

2. The method of claim 1, wherein the content document comprises a Content Protection Information Exchange Format document.

3. The method of claim 1, wherein the content document comprises a content document received from the digital rights management service.

4. The method of claim 1, wherein the seed data comprises at least one of content description information, usage rule information, usage rights information, cryptographic period information, and information shared between the service provider and the digital rights management service.

5. The method of claim 1, wherein generating the key identification information comprises generating the key identification information in accordance with one or more key identification information generation rules.

6. The method of claim 5, wherein the one or more key identification information generation rules comprise at least one operation applied to at least one of the content identification information and the seed data.

7. The method of claim 6, wherein the at least one operation comprises a concatenation operation.

8. The method of claim 6, wherein the at least one operation comprises a hashing operation.

9. The method of claim 6, wherein the at least one operation comprises a truncation operation.

10. The method of claim 6, wherein the at least one operation comprises concatenating the content identification information and the seed data to generate a unique identifier.

11. The method of claim 10, wherein the at least one operation further comprises hashing the unique identifier.

12. The method of claim 11, wherein the at least one operation further comprises truncating the hashed unique identifier to generate the key identification information.

13. The method of claim 1, wherein the rights management token request further comprises a key encryption key.

14. The method of claim 1, wherein the rights management token request further comprises rights information.

15. The method of claim 1, wherein the method further comprises receiving, in response to the rights management token request, a rights management token from the digital rights management service.

* * * * *